G. D. CHRISTNER, H. R. LAW & H. B. GORMAN.
KITE REEL.
APPLICATION FILED NOV. 4, 1912.
1,067,643.
Patented July 15, 1913.
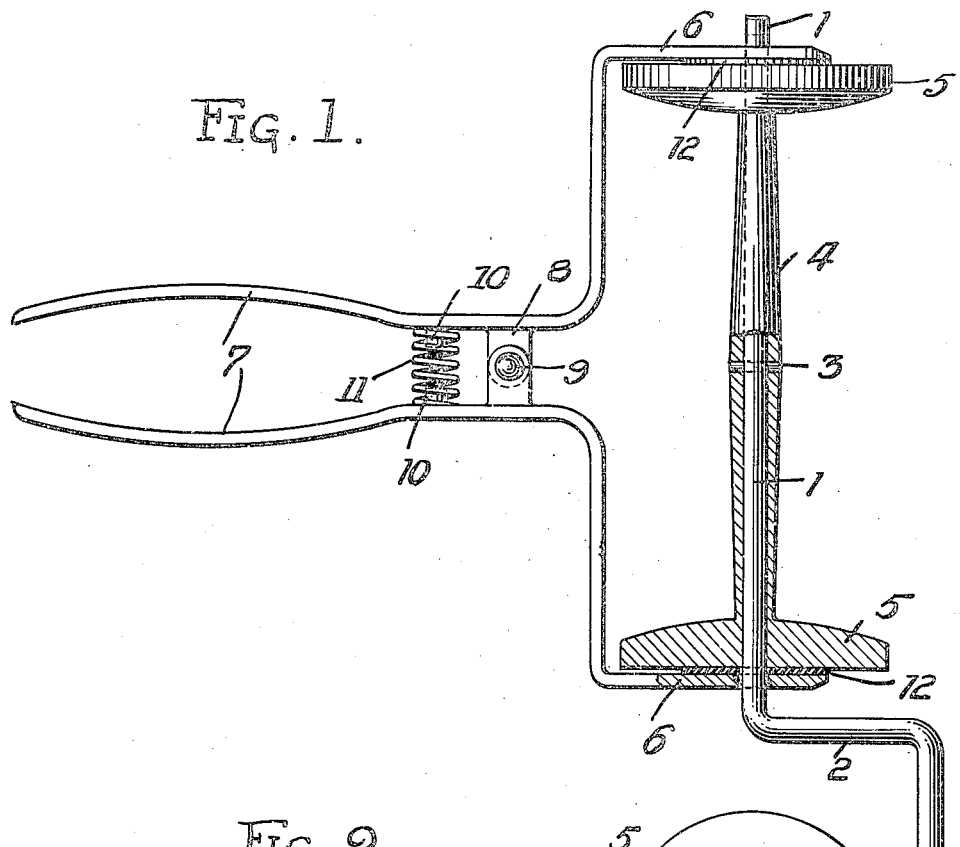
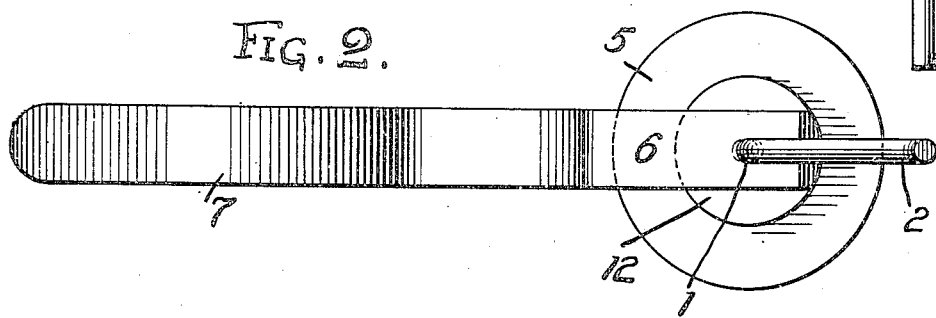
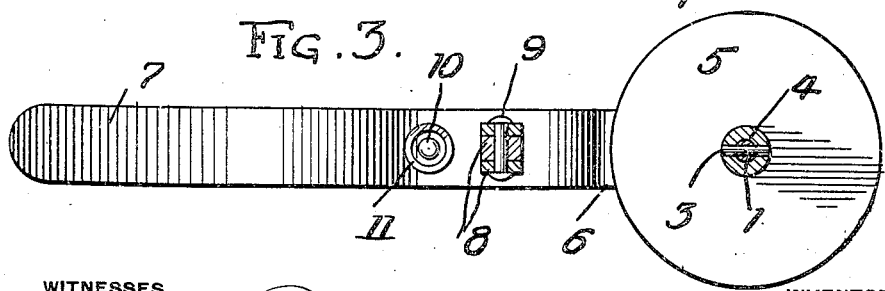
WITNESSES
INVENTORS
G. D. Christner
H. R. Law
H. B. Gorman
ATTORNEYS

UNITED STATES PATENT OFFICE.

GABRIEL D. CHRISTNER, HARRY R. LAW, AND HARRY B. GORMAN, OF McKEESPORT, PENNSYLVANIA.

KITE-REEL.

1,067,643.  Specification of Letters Patent.  Patented July 15, 1913.

Application filed November 4, 1912. Serial No. 729,527.

*To all whom it may concern:*

Be it known that we, GABRIEL D. CHRISTNER, HARRY R. LAW, and HARRY B. GORMAN, citizens of the United States of America, residing at McKeesport, in the county of Allegheny and State of Pennsylvania, have invented certain new and useful Improvements in Kite-Reels, of which the following is a specification, reference being had thereto in the accompanying drawing.

This invention relates to kite reels, and the primary object of our invention is to provide a novel reel that can be advantageously used by weather bureaus, juveniles and others for playing out the lines of captive balloons, kites and other air crafts used for determining aerial conditions or for pleasure purposes.

Another object of this invention is to provide a hand operated kite reel that has a holder serving as tension devices for locking or controlling the movement of a spool forming part of the reel.

A further object of this invention is to provide a kite reel that is simple in construction, durable, inexpensive to manufacture, easy to operate, and highly efficient for the purposes for which it is intended.

These and such other objects as may hereinafter appear are attained by a mechanical construction shown in the accompanying drawing, wherein:—

Figure 1 is a plan of the reel, partly broken away and partly in section, Fig. 2 is a side elevation of the same, and Fig. 3 is a longitudinal sectional view of the reel.

A reel in accordance with this invention comprises a shaft 1 having a crank or handle 2 at one end thereof. Mounted upon the shaft 1 by a transverse pin 3 or other fastening means is a spool or hub 4 having cylindrical heads or ends 5. The inner sides of the heads 5 are convex and the spool or hub tapers from an intermediate point to said heads, the tapering and convexity of the spool and heads facilitating the winding of a line upon the spool by rotating the shaft 1.

Loosely arranged upon the ends of the shaft 1 are the outer ends 6 of a pair of handles 7 that have inwardly projecting lugs 8 pivotally connected together by a pin or rivet 9. Adjacent to the lugs 8 the handles are provided with inwardly projecting pins 10 and encircling said pins are the end convolutions of a coiled compression spring 11.

The inner sides of the ends 6 of the handles are provided with friction disks 12 made of leather, rubber or other yieldable material, and the tension of the spring 11 is sufficient to hold these disks in engagement with the heads 5 whereby the spool is locked between the outer ends of the handles.

By holding the handles 7 in one hand and rotating the shaft 1 with the other hand a line can be wound upon the spool, and by releasing the shaft and bracing the handles 7 the disks 12, which serve as tension devices gradually permit the spool to be revolved by a line that is played out and attached to a balloon, kite or air craft.

The reel can be easily held for maintaining a line taut or for controlling to a great extent the flight of an aerial body. It is practically impossible for a line attached to the spool to become accidentally unwound or entangled, thereby facilitating and adding to the pleasure of flying a kite.

The reel in its entirety can be made of light and durable metal or other material, and of such sizes that it can be used in connection with a small kite or a large balloon, such as used by weather bureaus for determining weather conditions.

What we claim is:—

1. A reel comprising a revoluble shaft, a spool carried thereby, pivoted handles supporting and slidably mounted upon the ends of said shaft, tension devices carried by said handles and capable of engaging the spool for controlling the rotative movement of said spool, and means interposed between said handles for holding said tension devices normally in engagement with the ends of said spool.

2. A kite reel comprising pivoted handles, a shaft revolubly supported by said handles, said handles shiftable upon said shaft a spool mounted upon said shaft and having heads in proximity to the ends of said handles, friction disks carried by the ends of said handles and capable of engaging the heads of said spool when the handles are shifted for controlling the rotative movement of the spool, and a spring interposed between said handles for holding said friction disks normally in engagement with the heads of said spool.

3. A kite reel comprising a handle including a pair of shiftable arms, a revoluble shaft mounted in said arms and upon which said arms can shift, a spool mounted upon said shaft, and means at an end of said shaft for frictionally engaging an end of said spool for controlling the rotative movement of the spool, said means shiftable to operative position by said handle.

In testimony whereof we affix our signatures in the presence of two witnesses.

GABRIEL D. CHRISTNER.
HARRY R. LAW.
HARRY B. GORMAN.

Witnesses:
 MAX H. SROLOVITZ,
 KATHERINE ERRETT.